Dec. 8, 1936.　　　A. H. JOHNSON　　　2,063,606
DISPENSING DEVICE
Filed Jan. 30, 1935
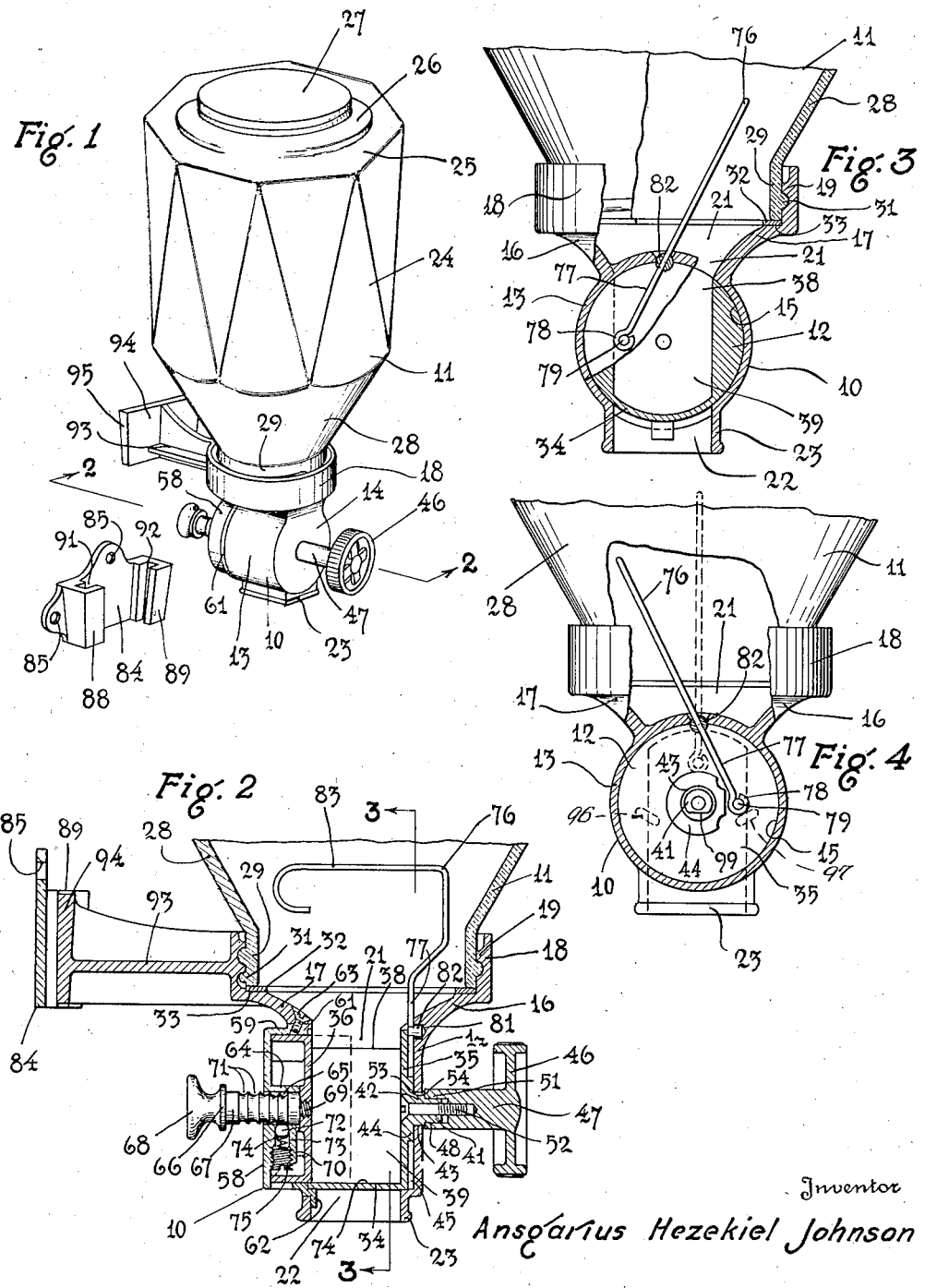
Inventor
Ansgarius Hezekiel Johnson
By Caswell & Lagaard
Attorneys Patented Dec. 8, 1936

2,063,606

UNITED STATES PATENT OFFICE 2,063,606

DISPENSING DEVICE

Ansgarius Hezekiel Johnson, Minneapolis, Minn.

Application January 30, 1935, Serial No. 4,029

12 Claims. (Cl. 221—107)

My invention relates to dispensing devices and particularly to devices for despensing measured quantities of various substances such as coffee and the like.

An object of the invention resides in providing a device which may be readily adjusted to procure various quantities of such substances.

A still further object of the invention resides in providing a case having a cylindrical bore therein and in providing within said case a drum constructed with a cylindrical wall and with two heads forming a laterally opening pocket, one of said heads being fixed relative to the drum and the other being movable with respect thereto.

A feature of the invention resides in constructing the case with an inlet communicating with said pocket when the drum is in one position and with an outlet communicating with the pocket when the drum is in another position.

Another object of the invention resides in constructing the case open at one end and with an end wall at its other end and in providing the fixed head of the drum with a trunnion extending through said end wall and in further providing a knob secured to said trunnion for turning the drum.

A still further object of the invention resides in providing means extending through said case for moving said movable head to vary the capacity of the device.

A feature of the invention resides in employing a plunger for said movable head, said plunger turning with respect to said case and being adapted to be slid toward and from the fixed head.

An object of the invention resides in providing an end bell attached to said case for closing the open end thereof.

Another object of the invention resides in mounting said plunger for rotation and reciprocation in said end bell.

A feature of the invention resides in constructing said plunger with depressions and in providing latching means in said end bell for engagement with said depressions to hold the movable head in adjusted position.

Another object of the invention resides in the specific construction for attaching the end bell to the case.

A still further object of the invention resides in providing an agitator extending into the inlet to the case and operated by said drum.

An object of the invention resides in spacing the fixed head from the end wall of the case and in extending said agitator into said space.

Another object of the invention resides in the specific construction of the agitator and in the manner of mounting and operating the same.

An object of the invention resides in providing a container having openings at the upper and lower end thereof, said container being secured to said case with the lower end communicating with the inlet and in further providing a closure for the upper end of said case.

Other objects of the invention reside in the novel combination and arrangement of parts and in the details of construction hereinafter illustrated and/or described.

In the drawing:

Fig. 1 is a perspective view of a dispensing device illustrating an embodiment of my invention.

Fig. 2 is a fragmentary elevational sectional view taken on line 2—2 of Fig. 1.

Fig. 3 is an elevational sectional view taken on line 3—3 of Fig. 2.

Fig. 4 is a view similar to Fig. 3 showing the parts in altered position.

In the dispensing of coffee for the purpose of the preparation of coffee beverage, it becomes highly desirable to quickly and conveniently adjust the amount of coffee discharged every time the device is operated. The present invention provides an extremely simple and practical device whereby these desired results can be procured.

My invention comprises a case 10 which contains the measuring and dispensing elements of the invention and to which is attached a jar 11 serving as a container for the substance to be dispensed. Within the case 10 is disposed a drum 12 which operates upon rotation to measure predetermined quantities of the substance contained within the jar 11 and to discharge the same from said case. These various parts will now be described in detail.

The case 10 is substantially cylindrical in form being constructed with a cylindrical wall 13 and with an end wall 14 connected thereto. The other end of the case is open to give access to the interior thereof. This construction provides a cylindrical bore 15 within the case which communicates with the exterior through the open end thereof. The case is further constructed with a cap 16 forming a part thereof, which cap is provided with an outwardly flaring wall 17 terminating in an upwardly extending circular flange 18. The circular flange 18 is threaded as designated at 19 for the purpose of attaching the jar 11 thereto. The cylindrical wall 13 of said case is constructed with an opening 21 at the upper portion thereof which forms an inlet for the case and is further constructed with an opening 22 at the lower portion thereof which constitutes the outlet for the case. A spout 23 at the outlet 22 serves to lead the measured quantity of substance from the device and to direct it into any suitable receptacle placed beneath the said spout.

The jar 11 comprises a body portion 24 which may be of any desired shape and which may be constructed ornamental in appearance. This jar is provided at the upper portion thereof with a top 25 which is constructed with an opening through which the substance to be dispensed may be introduced into said jar. This opening is surrounded by a threaded neck upon which may be screwed a cover 27 by means of which access to the jar may be had. The lower portion of the jar is constructed with a hopper 28 which directs the contents of the jar into the case 10. This hopper is also constructed with an opening which is surrounded by a neck 29. Neck 29 is constructed with threads 31 which engage the threads 19 of the flange 18 and by means of which the jar may be attached to the case 10. A gasket 32 disposed between the end of the neck 29 and a shoulder 33 formed on the wall 17 of cap 16 forms a suitable seal between the container 24 and the case 10. A similar gasket may be used between the cover 27 and the jar.

The drum 12 is cylindrical in form and is disposed within the bore 15. This drum comprises a cylindrical wall 34 and two heads 35 and 36 at the ends of the same forming a pocket 39 within said drum. The head 35 is fixed with respect to the drum, being integral with the wall 34 thereof while the head 36 is movable toward and from the head 35 in a manner to be presently described in detail. The cylindrical wall 34 of the drum is formed with a lateral opening 38 by means of which the pocket 39 may be brought into communication with either the inlet 21 or the outlet 22. When the drum 12 is turned to the position shown in Fig. 3 coffee or any other substance contained within the jar 11 passes through the hopper 28 and inlet 22 into pocket 39. When the drum 12 is turned to the position shown in Fig. 4 the opening 38 of pocket 39 is brought into communication with the outlet 22 which permits of the discharge of the substance from said pocket and into any suitable receptacle placed beneath the spout 23.

The drum 12 is rotatably mounted in the bore 15 in case 10 and also in a bearing formed in the end wall 14 of the case. For turning the drum the said drum is constructed with a trunnion 41 which projects outwardly from the head 35 thereof. This trunnion is enlarged as indicated at 42 to form a shaft which is received within a bearing 43 in the end wall 14 of the case. A collar 44 formed on the head 35 adjacent the shaft 42 engages the end wall 14 of the case and holds the said head spaced therefrom, leaving an annular space 45 between said drum and case. The drum 12 is turned by means of a knob 46. This knob has attached to it a shank 47 which is provided with a socket 48 adapted to receive the trunnion 41. A segment key 51 on the shank 47 engages a corresponding flat 99 formed on the trunnion 41, which prevents relative rotation between the knob 46 and the drum proper. The knob 46 is held attached to the drum by means of a countersunk machine screw 52 which extends through the head 35 of the drum and trunnion 41 thereof and which is threaded into the shank 47 of said knob 46. The shaft 42 forms a shoulder 53 against which the end 54 of the shank 47 abuts. By means of this construction the drum is held from axial movement, the collar 44 restraining movement in one direction and the end 54 of the shank 47 restraining movement in the other direction.

For closing the open end of the case 10 an end bell 58 is employed. This end bell is provided with a flange 59 which is received in the end of the bore 16. Flange 59 is constructed with a bead 61 which engages the end of the case 10 and which restrains movement of the said flange inwardly into the bore 15. A lug 62 formed in the lowermost portion of the flange 59 engages into the spout 23 and holds the lowermost portion of said end bell in position. In the flaring wall 17 of cap 16 is provided a countersunk machine screw 63 which is threaded into the flange 59 and holds the upper portion thereof attached to the neck. By means of this construction the end bell is securely held in position through means inaccessible from the exterior of the case.

The end bell 58 is provided at the center thereof with an inwardly extending boss 64. This boss is formed with a bore 65 in which is slidably and rotatably mounted a plunger 66. Plunger 66 is formed with a spindle 67 which can slide and rotate in the bore 65 and is provided at its outer end with a button 68 by means of which the said plunger may be manipulated. The extreme end 69 of the spindle 67 is reduced in diameter and threaded to screw into the head 36 of drum 12. By means of this construction the said head may be reciprocated longitudinally with respect to the axis of said drum so as to vary the length of the pocket 39. The head 36 is shown at its extreme left hand position in full lines in Fig. 2 and at its extreme right hand position in dotted lines in said figure. When in the position shown in full lines the pocket 39 is of maximum capacity and when the head is disposed as shown in dotted lines the pocket is of minimum capacity.

For the purpose of holding the head 36 in adjusted position the spindle 67 is constructed with a number of circumferential grooves 71. A ball 72 mounted in the end bell 58 is adapted to engage these grooves and to hold the plunger 66 from axial movement. This ball is contained in an elongated opening 73 formed in a boss 70 on end bell 58. A spring 74 is seated at one end against said ball and urges the ball into engagement with the groove 71. This spring is seated at its other end against a plug 75 screwed into the boss 74. By means of this construction a yielding latching mechanism is provided which permits of sliding the plunger 66 axially to move the head 36 toward and from the head 35. Such construction also serves to retain the plunger and the head attached thereto in adjusted position.

In order to accurately measure out a predetermined amount of the substance contained within the jar 11 an agitator 76 is employed. This agitator is preferably constructed from wire and embodies an elongated portion 77 which extends through the flaring wall 17 of cap 16 and into the space 45 between the head 35 and end wall 14 of case 10. The end of the elongated portion 77 is constructed with an eye 78 which is looped over a pin 79 formed on the head 35. This pin serves to slide the portion 77 with respect to the case. To provide a tight joint at the point of entry of agitator 76 into the space 45, the following construction is used. At such locality a socket 81 is formed in cap 16 which has mounted in it a cylindrical plug 82. This plug substantially fills the socket which is closed by the head 35. The portion 77 extends through the said plug and slides in the same. As the agitator is oscillated and reciprocated the same slides in plug 82 and the said plug simultaneously rotates. At the end of the agitator 76 is provided an arm 83 which extends transversely across the hopper 28 of jar 11 and serves to agitate the substance within the jar. By means of this construction the pocket 39 is always filled to capacity and the same amount of substance discharged from the device each time the device is operated.

For the purpose of supporting the device a wall plate 84 is employed which is attached to the wall through screws insertable through suitable openings 85 in said plate. The plate 84 is formed with two ears 88 and 89 which are constructed with facing grooves 91 and 92 arranged in converging relation to form a socket. A bracket 93 is attached to the cap 16 and is provided with a head 94 having lateral portions 95 adapted to enter the grooves 91 and 92. By means of this construction the entire device may be easily and quickly applied to the wall plate 94 and when applied is firmly attached thereto. Upon raising the device the same is readily removed from the wall plate to permit of inspection and repair.

The use of my invention is as follows: The wall plate 84 is first attached to the wall by applying screws thereto through the holes 85. Head 94 is next inserted into the socket formed in said wall plate. The device is then rigidly mounted. Cover 27 is next removed and the container 24 filled with the desired substance to be dispensed. Knob 46 is next rotated to the left as far as it will go taking the position shown in Fig. 3. When in this position the opening 38 in drum 12 communicates with the inlet 21 and the coffee or other substance contained within container 24 enters the pocket 39. When in such position the eye 78 of the agitator 76 engages a stop 96 formed on the end wall 14 of case 10 which limits the turning of the drum. The knob 46 is then turned in a clockwise direction until the eye 78 engages another stop 97 formed on the end wall 14 of case 10 opposite the stop 96. The parts are then disposed as in Fig. 4. When so arranged the opening 38 to pocket 39 is in communication with the outlet 22 and the coffee or other substance contained within said pocket discharges through the spout 23 and into the receptacle placed beneath the device.

My invention is highly advantageous in that an extremely simple and practical device is provided whereby predetermined amounts of coffee or any other desired bulk substance may be accurately measured out and dispensed. The device can be constructed by ordinary manufacturing methods at an extremely economical price. Adjustment of the amount of substance measured may be accomplished by simple manipulation of the adjusting plunger which is accessible from the exterior of the case. This plunger is so designed that predetermined quantities can be procured by moving the said plunger to predetermined positions. By means of the agitator employed the same amount of substance is at all times delivered. The device is extremely neat and attractive in appearance. There are no complicated or intricate parts to get out of order and the device will function indefinitely without attention. All of the devices for fastening the parts together are disposed within the interior of the case so that the same are completely concealed and protected and out of view.

Changes in the specific form of my invention, as herein disclosed, may be made within the scope of what is claimed without departing from the spirit of my invention.

Having described my invention, what I claim as new and desire to protect by Letters Patent is:

1. In a dispensing device, a case having a cylindrical bore, said case being open at one end and having an end wall at its other end, a drum within said case adapted to turn about its longitudinal axis, said drum being constructed with a cylindrical wall, a head at one end fast to said cylindrical wall and a head at its other end movable toward and from said first named head and forming in conjunction with said cylindrical wall and first named head a pocket in said drum opening laterally through said cylindrical wall, means extending through said end wall of the case for turning said drum, an end bell secured to the open end of said case, a plunger concentrically disposed with respect to the axis of said drum and mounted for axial movement in said end bell, said movable head being carried by said plunger, means forming an inlet in said case communicating with said pocket when the drum is in one position, and means forming an outlet in said case communicating with said pocket when the drum is in another position.

2. In a dispensing device, a case, a drum within the case adapted to turn about its longitudinal axis, said drum having a pocket provided with a lateral opening and bounded at one end by a head movable axially with respect to said drum, a member slidably mounted in said case and extending through the wall of the same for engagement without the case, said member being connected to said head and serving to move the same, means extending through the wall of the case for turning said head, means forming an inlet in said case communicating with said pocket when the drum is in one position, and means forming an outlet in said case communicating with said pocket when the drum is in another position.

3. In a dispensing device, a case, a drum within the case adapted to turn about its longitudinal axis, said drum having a pocket provided with a lateral opening and bounded at one end by a head movable axially with respect to said drum, a member slidably mounted in said case and extending through the wall of the same for engagement without the case, said member being connected to said head and serving to move the same, latching means for engaging said member to hold the head in adjusted position, means extending through the wall of the case for turning said drum, and means forming an inlet in said case communicating with said pocket when the drum is in one position, and means forming an outlet in said case communicating with said pocket when the drum is in another position.

4. In a dispensing device, a case having a cylindrical bore, said case being open at one end and being formed with an end wall at its other end, a drum insertable into said case through the open end thereof, said drum being constructed with a laterally opening pocket, means extending through said end wall for turning said drum and for journalling the same, an end bell for closing said case at the open end thereof, said end bell having a hook on one side thereof extending into said case and engaging a part thereof, and a screw threaded into said case from the interior thereof and engaging said end bell on the other side thereof, said hook and screw serving to hold the end bell in position, means forming an inlet in said case communicating with said pocket when the drum is in one position, and means forming an outlet in said case communicating with said pocket when the drum is in another position.

5. In a dispensing device, a case having a cylindrical bore, said case being open at one end and being provided with an end wall at its other end, a drum insertable into said case through the open end thereof, said drum being constructed with a laterally opening pocket, a trunnion on said drum extending through the end wall of said case, said trunnion being formed with an eccentric part, a knob having a shank, said shank being constructed with a bore to receive said trunnion, said shank having an eccentric part engaging the eccentric part of said trunnion and holding said knob from rotation with respect to the drum, said drum being formed with a shoulder against which said shank abuts, the end of said shank limiting the movement of the drum axially within said bore, a screw extending through the end wall of said drum and trunnion and threaded into said shank, means for closing the open end of said case, means forming an inlet in said case communicating with said pocket when the drum is in one position, and means forming an outlet in said case communicating with said pocket when the drum is in another position.

6. In a dispensing device, a case having a cylindrical bore, said case being open at one end and being provided with an end wall at its other end, a drum insertable into said case through the open end thereof, said drum being constructed with a cylindrical wall and two heads forming a laterally opening pocket therein, one of said heads lying adjacent the end wall of said case, a collar on said drum adjacent one head and spacing said head from the end wall of the case, means forming a hopper in said case communicating with said pocket when the drum is in one position, means forming an outlet for the case communicating with said pocket when the drum is in another position, an agitator comprising a spindle member extending into the case and into the space between said head and end wall, means for guiding said member for sliding and swinging movement at its point of entry into the case, means attached to said head and engaging said member for oscillating the same upon turning of said drum and agitating means formed on said agitator and extending into said hopper.

7. In a dispensing device, a case having a cylindrical bore, said case being open at one end and being formed with an end wall at its other end, a drum insertable into said case through the open end thereof, said drum being constructed with a cylindrical wall and two heads forming a laterally opening pocket therein, one of said heads lying adjacent the end wall of said case, a collar on said drum adjacent one head and spacing said head from the end wall of the case, means forming a hopper in said case communicating with said pocket when the drum is in one position, means forming an outlet for the case communicating with said pocket when the drum is in another position, an agitator comprising a wire member extending through the case and into the space between said head and end wall, a cylindrical socket in said case at the point of entry of said wire member therein, said socket having its axis parallel to the axis of said drum, a cylindrical sealing member disposed within said socket for oscillatory movement therein, said wire member being slidably mounted in said sealing member, means carried by said head for oscillating and sliding said wire member, and agitating means on said agitator disposed within said hopper.

8. In a dispensing device, a receptacle, a case attached thereto and having a cylindrical bore in communication with said receptacle and being formed at one end of said bore with an end wall, a drum within said bore, said drum having a head spaced from said end wall, an agitator having a part disposed between said head and end wall, and another part extending into said receptacle, means carried by said end wall for supporting said agitator for sliding and swinging movement, and means on said head for engagement with said agitator part for operating the agitator.

9. In a dispensing device, a receptacle, a case attached thereto and having a cylindrical bore in communication with said receptacle and being formed at one end of said bore with an end wall, a drum within said bore, said drum having a head spaced from said end wall, an agitator having a part disposed between said head and end wall, and another part extending into said receptacle, means carried by said end wall for supporting said agitator for sliding and swinging movement, said agitator part having an opening therein, and a crank pin on said head of a length substantially equal to the distance between said head and end wall, said crank pin extending through said opening in the agitator and operating said agitator.

10. In a dispensing device, a receptacle, a case attached thereto and having a cylindrical bore in communication with said receptacle and being formed at one end of said bore with an end wall, a drum within said bore, said drum having a head disposed adjacent said end wall, a trunnion on said head integral therewith and extending through said end wall, said trunnion having an eccentric part, a knob having a shank, said shank being constructed with a bore to receive said trunnion, said shank having an eccentric part engaging the eccentric part of said trunnion and holding the knob from rotation relative to the drum, said trunnion being formed with a shoulder against which the shank abuts, the end of the shank limiting the movement of the drum relative to the case, a screw extending through said drum and trunnion and threaded into said shank, said screw being accessible from the interior of the drum.

11. In a dispensing device, a case having a cylindrical bore, and an end wall for said bore, a drum within said case adapted to turn about its longitudinal axis, said drum having a cylindrical wall and a head at one end movable axially relative to the cylindrical wall, a plunger attached to said head and extending through said end wall, said end wall having an inwardly extending boss for guiding said plunger for sliding movement, and a flange on said head extending in the opposite direction to said boss and overreaching said boss in one position of said head, said plunger having grooves thereon, and a member carried by said case and disposed within the same, said member being resiliently urged against said grooves.

12. In a dispensing device, a case having a cylindrical bore, and an end wall for said bore, a drum within said case adapted to turn about its longitudinal axis, said drum having a cylindrical wall and a head at one end movable axially relative to the cylindrical wall, a plunger attached to said head and extending through said end wall, said end wall having an inwardly extending boss for guiding said plunger for sliding movement, and a flange on said head extending in the opposite direction to said boss and overreaching said boss in one position of said head, said plunger having grooves thereon, said boss having a radial slot therein, a ball reciprocable in said slot, and a spring in said slot for urging said ball against the grooves in said plunger, said ball and spring being disposed within said case and within the confines of said flange when the head is in one position.

ANSGARIUS HEZEKIEL JOHNSON.